UNITED STATES PATENT OFFICE.

JOHN ROBERT KÖHLER, OF STOCKHOLM, SWEDEN.

SHELLAC SURROGATE AND PROCESS OF PRODUCING SAME.

1,327,332.     Specification of Letters Patent.     Patented Jan. 6, 1920.

No Drawing.     Application filed April 22, 1918. Serial No. 230,081.

*To all whom it may concern:*

Be it known that I, JOHN ROBERT KÖHLER, a citizen of the Kingdom of Sweden, residing at Stockholm, Sweden, have invented new and useful Improvements in Shellac Surrogates and Process of Producing the Same, of which the following is a specification.

This invention relates to a shellac-surrogate produced from resin of conifers such as fir and pine trees and a process of producing the same.

I have discovered that uncrystallized, amorphous substances occurring in natural resin and consisting substantially of amorphous oxidized resin acids form an excellent surrogate for the dearer shellac as used for different purposes, for instance in the production of polish, lacs, insulating materials, etc. The said oxidized products formed by oxidation of the native crystalline resin acids of the natural resin show, as to the solubility, polishing properties, etc., a great resemblance to the natural shellac. Alcoholic solutions of such products afford hard and bright coatings resisting the influence of hydrocarbons, fat and oils. Owing to the cheapness of the substitute its use may even be more extensive than that of genuine shellac, since the former may, for instance, be used for inner coatings of petroleum casks or the like.

Most suitable as raw material for the production of the present substitute is old natural resin being richer in amorphous products than fresh resin. The manufacture of the new product may preferably be accomplished by extraction of the natural resin, if desired, after being liberated from the oil of turpentine in any suitable manner, by means of any suitable solvent adapted to extract the crystalline resin acids, but not or at least only to a small extent the amorphous constituents. Such solvents are for instance petroleum, ether, benzol, oil of turpentine, mineral oils, etc. The said amorphous constituents remain in the residue of extraction together with various impurities, such as fragments or bark or the like, which may be easily separated by treating the residue with a solvent for the amorphous constituents, for instance ethyl- or methyl-alcohol.

The filtrated solution corresponds to a solution of genuine shellac and may be used as such, or else the shellac-substitute may be produced therefrom in a solid state by evaporating the solvent.

In order to dissolve the crystalline resin acids as perfectly as possible, it is of importance that the raw material is used in a finely divided state. If the local temperature is not too high, the pulverization of the natural resin may be effected by means of a grinding mill. Preferably, the extraction of the crystalline resin acids is effected under active stirring or agitation, and at the same time it is to be observed that heating is generally avoided, since certain solvents, which in a cold state are indifferent in relation to the amorphous constituents, dissolve the latter to a certain extent in a hot state, the output of the product to be used as a shellac - substitute thereby being decreased.

Instead of proceeding from natural resin, as raw material, one may use as raw material the so-called water-resin obtained by separating the oil of turpentine from the resin, by means of steam, or colophony, produced from natural resin by separating the oil of turpentine and other easily volatile substances under heating.

In order to increase the output of products practicable as shellac-substitute the raw material whether consisting of natural resin or of colophony, may be previously oxidized in an artificial manner. The oxidation is effected by means of air or oxygen alone, preferably under moderate heating, the raw material, if desired, being used in solution.

After the oxidation the unconverted crystalline resin acids are always extracted in the manner above stated, in order to obtain a product practicable as shellac.

Example: 600 kilograms of ground and sifted old natural resin containing 110 kilograms of solid impurities is mixed with 750 kilograms of oil of turpentine in a cold state and stirred four hours. The solution is filtered off and the remainder washed twice with 250 kilograms of oil of turpentine. By the oil of turpentine 210 kilograms of resin are dissolved. After vaporization of the oil of turpentine the resin is obtained in a solid state as a light colophony of high quality, while from the remainder 220 kilograms of a product practicable as shellac - substitute are dissolved by means of common spirit. This result corresponds substantially to what is generally obtained by working on a larger scale.

In practice, the product manufactured according to this invention has proved to be equal to the genuine shellac in its use as polish and for the manufacture of varnish, and it is applied exactly in the same manner as genuine shellac. For the production of spirit lacs and other coatings it is dissolved separately or mixed with other resins, balsams, etc., in any common solvent used in such manufacture.

The product may also be hardened in the same manner as colophony by melting it with metal oxids, as for instance oxid of calcium of zinc, or with glycerin or other hardening substances.

I claim:—

1. A shellac surrogate, consisting of amorphous residues of natural resin of conifers.

2. A shellac surrogate consisting essentially of oxidized amorphous resin acids separated from natural resin of conifers.

3. A shellac surrogate, consisting essentially of amorphous resin acids separated from the natural resin of conifers and combined with a resin hardening substance.

4. A shellac-surrogate, consisting essentially of amorphous resin acids separated from the natural resin of conifers and combined with glycerin.

5. The process of producing shellac-surrogate, consisting in extracting the crystallizable resin acids from natural resin of conifers, and treating the residue with a solvent adapted to separate the amorphous resin acids contained therein from the impurities.

6. The process of producing shellac-surrogate, consisting in treating natural resin of conifers with a solvent adapted to dissolve the crystallizable resin acids contained therein and then extracting the amorphous resin acids from the residue by means of alcohol.

7. The process of producing shellac-surrogate, consisting in recovering the oil of turpentine from natural resin of conifers, extracting the crystalline resin acids from the residue and treating the remainder with a solvent adapted to dissolve the amorphous oxidized resin acids.

8. The process of producing shellac-surrogate, consisting in oxidizing crystalline resin acids by means of oxygen, and removing the remaining not oxidized resin acids by a solvent essentially incapable of dissolving the oxidized resin acids.

9. The process of producing shellac-surrogate, consisting in oxidizing crystalline resin acids under heating, and removing the remaining unoxidized resin acids by a solvent essentially incapable of dissolving the oxidized resin acids.

In testimony whereof I have signed my name.

JOHN ROBERT KÖHLER.